(12) United States Patent
Moffat et al.

(10) Patent No.: US 9,664,867 B2
(45) Date of Patent: May 30, 2017

(54) FLEXIBLE HERMETIC PACKAGE FOR OPTICAL DEVICE

(71) Applicant: Lumentum Operations LLC, Milpitas, CA (US)

(72) Inventors: Steven Harold Moffat, Mississippi Mills (CA); Nenad Duricic, Ottawa (CA); Simon Moore-Crispin, Carleton Place (CA)

(73) Assignee: Lumentum Operations LLC, Milpitas, CA (US)

( * ) Notice: Subject to any disclaimer, the term of this patent is extended or adjusted under 35 U.S.C. 154(b) by 0 days.

(21) Appl. No.: 15/238,774

(22) Filed: Aug. 17, 2016

(65) Prior Publication Data

US 2016/0356972 A1 Dec. 8, 2016

Related U.S. Application Data

(63) Continuation of application No. 14/446,562, filed on Jul. 30, 2014, now Pat. No. 9,428,322.

(60) Provisional application No. 61/860,433, filed on Jul. 31, 2013.

(51) Int. Cl.
| | |
|---|---|
| *G02B 6/42* | (2006.01) |
| *B65D 85/38* | (2006.01) |
| *G02B 6/36* | (2006.01) |
| *B65D 65/42* | (2006.01) |

(52) U.S. Cl.
CPC .......... *G02B 6/4251* (2013.01); *B65D 85/38* (2013.01); *G02B 6/4236* (2013.01); *G02B 6/4248* (2013.01); *G02B 6/4254* (2013.01); *B65D 65/42* (2013.01); *G02B 6/36* (2013.01); *G02B 6/4292* (2013.01); *G02B 6/4293* (2013.01); *Y10T 29/49002* (2015.01)

(58) Field of Classification Search
None
See application file for complete search history.

(56) References Cited

U.S. PATENT DOCUMENTS

| | | | | |
|---|---|---|---|---|
| 4,653,846 A * | 3/1987 | Yamazaki | ............ | G02B 6/4428 174/70 S |
| 5,210,815 A * | 5/1993 | Alexander | ............. | G02B 6/262 385/138 |
| 5,793,916 A * | 8/1998 | Dahringer | ............ | G02B 6/2848 385/33 |
| 7,526,175 B2 * | 4/2009 | Sumitani | .............. | G02B 6/4428 174/70 S |
| 9,428,322 B2 | 8/2016 | Moffat et al. | | |
| 2002/0056850 A1 | 5/2002 | Murata | | |

(Continued)

FOREIGN PATENT DOCUMENTS

| | | |
|---|---|---|
| EP | 1241503 | 9/2002 |
| GB | 2316808 | 3/1998 |
| JP | H07 230020 | 8/1995 |

OTHER PUBLICATIONS

EP Application No. 14179453 Search Report Dated Mar. 19, 2015.

*Primary Examiner* — Jerry Rahll
(74) *Attorney, Agent, or Firm* — Harrity & Harrity, LLP

(57) ABSTRACT

An opto-electronic package having two enclosures in which a first non-hermetic enclosure provides the structural rigidity required to maintain the alignment of the optical components for a predetermined environmental range, and second flexible enclosure that provides a hermetical seal for the opto-electronic package.

20 Claims, 6 Drawing Sheets

(56) References Cited

U.S. PATENT DOCUMENTS

| 2002/0110330 | A1 | | 8/2002 | Brogan et al. | |
|---|---|---|---|---|---|
| 2003/0235372 | A1 | * | 12/2003 | Schott | G02B 6/4248 385/60 |
| 2004/0264895 | A1 | * | 12/2004 | Holt | G02B 6/4248 385/100 |

* cited by examiner

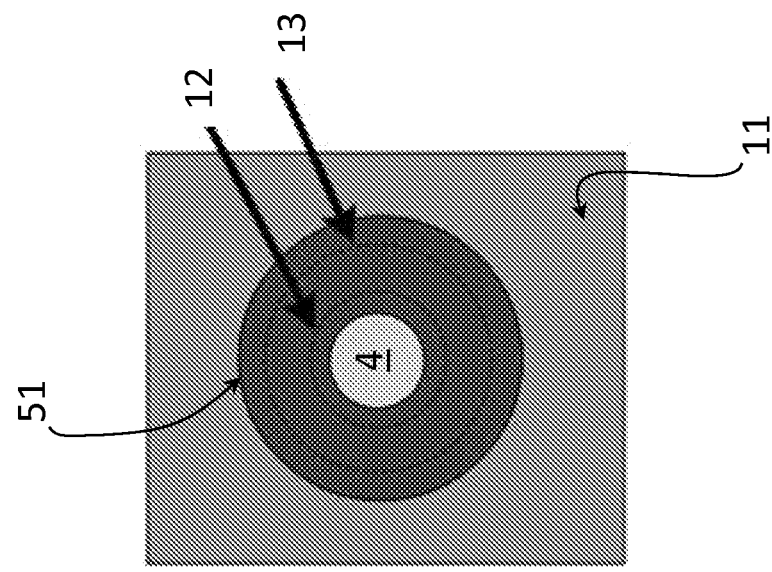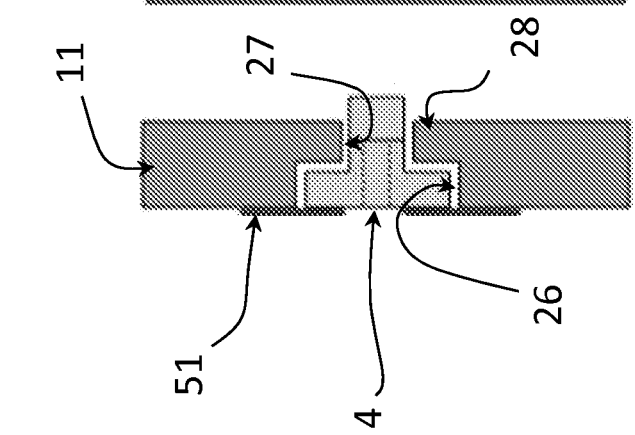

FLEXIBLE HERMETIC PACKAGE FOR OPTICAL DEVICE

CROSS-REFERENCE TO RELATED APPLICATIONS

This application is a continuation of U.S. patent application Ser. No. 14/446,562, filed Jul. 30, 2014 (now U.S. Pat. No. 9,428,322), which claims priority from U.S. Provisional Patent Application No. 61/860,433 filed Jul. 31, 2013, the disclosures of which are incorporated herein by reference.

TECHNICAL FIELD

The present invention relates to packaging, and in particular to a hermetic package for an optical device.

BACKGROUND

A wavelength selective switch (WSS) is a free space optical system that has relatively long optical path lengths. Within that optical system the beam is redirected by reflection, refraction and diffraction. Of these, the beam propagation direction upon diffraction and refraction is sensitive to the ambient index of refraction of the optical system, e.g. the index of refraction of the gaseous medium between the optical elements. Changes in the index of refraction of that medium result in a change in the beam propagation direction and a degradation in the WSS optical performance. There are two ways that changes in the index of refraction of the medium can come about:

1) Changes in the composition of the medium can change the index of refraction. Composition changes can be a result of outgassing of elements within the package or as a result of gas exchange through a leak in the package. Typically, the requirements for package hermeticity is $5 \times 10^{-8}$ atm cc/s Helium leak rate.

2) Changes in the density of the medium can also change the index of refraction. Changes in density can result from changes in the package volume in response to external pressure fluctuations. Typically, volume change are required to be less than 1%, so as not to impair the optical performance excessively. Note that structural rigidity can also be important in cases where the optics are rigidly coupled to the external package, as is the case in some compact WSS's, since package deformation under external forces can couple directly to the optics.

Varying external temperature may also result in changes in the package volume, and the result is a temperature dependent index of refraction for the free space medium surrounding the optics, because a temperature change in the volume changes the density, which changes the index of refraction. In this case, however, through selection of optical materials and their dn/dT, the variation of index of refraction with temperature, the $dn_{medium}/dT$ may be compensated for with the $dn_{glass}/dT$.

Hermetic packages for optical devices represent a significant cost element, which arises from the fact that current methods, utilizing a single structural-hermetic package, necessitate design compromises to simultaneously meet the dual requirements of hermeticity and structural rigidity. These design compromises tend to increase the package cost. Examples include:

1) The use of specialized alloys, e.g. Kovar™, as a package material for their thermal expansion (CTE) properties with high temperature co-fired ceramic (HTCC) and glass to metal seal (GTMS) electrical feedthroughs.

2) Use of specialized hermetic suppliers, to produce the entire package. Unfortunately, because all the elements are integrated into a single package, the supplier delivers, not only the hermetic electrical feedthrough in which they specialize, but also the less demanding elements of the package.

3) Package-wide plating requirements and tight tolerances driven by hermetic processes.

By separating or decoupling the structural and hermetic design elements, each can be delivered at substantially lower cost.

Glass to Metal Seal (GTMS) and High Temperature Co-fired Ceramic (HTCC) are typically used to achieve the electrical feedthrough function in hermetic packages. Each of these sealing methods requires that the CTE of the package material is strictly matched to the CTE of the feedthrough material. Kovar is well CTE matched to the HTCC material, and Kovar may also be used to form a compressive seal around a glass feedthrough. Unfortunately, Kovar is quite an expensive material, and the fact that it is difficult to machine only adds to the cost of Kovar packaging.

The present invention seeks to reduce the amount, i.e. package area, of Kovar that is required to interface to the HTCC or GTMS, and to replace the balance of the hermetic enclosure with a less expensive material.

In some WSS products a Kovar/GTMS cap, which gets sealed to an aluminum package body, is used, because aluminum is much cheaper than Kovar. However, the available sealing method for hermetically sealing Kovar to aluminum, e.g. solder, drives stringent requirements on plating, i.e. to enable the solder to wet the surface and make a good seal, and on the machining of the mating surfaces of the seal, i.e. to ensure a complete seal without solder voids while at the same time avoiding solder spills. In some prior art systems, a machined tongue and groove arrangement, which is gold plated, is used to achieve a good seal. Unfortunately, the cost of machining and of the gold drives the total cost up.

An object of the present invention is to overcome the shortcomings of the prior art by providing packaging for an optical device, which decouples structural and hermetic requirements.

SUMMARY

Accordingly, the present invention relates to a package for an optical component comprising:

a flexible hermetic barrier membrane surrounding the optical component;

at least one access port hermetically sealed in the flexible hermetic barrier membrane enabling at least one of optical and electrical coupling to the optical component; and a solid structural package surrounding the optical component;

wherein the flexible hermetic barrier membrane conforms to the solid structural package, whereby the volume of the flexible hermetic barrier membrane does not change with variations in the external environmental air pressure.

Another aspect of the present invention relates to a method of manufacturing an optical package comprising:

mounting an optical component within a flexible hermetic barrier with optical and electrical elements of the optical component aligned with hermetically sealed optical and electrical feedthroughs in the flexible hermetic barrier;

covering the flexible hermetic barrier with a coating, which hardens into a solid structural package surrounding the flexible hermetic barrier.

Another embodiment of the present invention provides a package for an optical component comprising:

a solid structural package surrounding the optical component with an opening extending therethrough;

a feed through extending through the opening in the solid structural package, with an access port extending through the feed through enabling at least one of optical and electrical coupling to the optical component; and a flexible hermetic barrier membrane sheet surrounding the opening, the sheet having a first seal with the feed through around the access port, and a second seal with the solid structural package around the opening and the first seal;

whereby the volume of the flexible hermetic barrier membrane does not change with variations in the external environmental air pressure.

BRIEF DESCRIPTION OF THE DRAWINGS

The invention will be described in greater detail with reference to the accompanying drawings which represent preferred embodiments thereof, wherein:

FIG. 3a illustrates a cross-sectional view of a feedthrough access port of the optical package of FIG. 2;

FIG. 3b illustrates a front view of the feedthrough access port of FIG. 3a;

FIG. 6a illustrates a cross-sectional view of a feedthrough access port of the optical package of FIG. 5; and FIG. 6b illustrates a front view of the feedthrough access port of FIG. 6a.

DETAILED DESCRIPTION

While the present teachings are described in conjunction with various embodiments and examples, it is not intended that the present teachings be limited to such embodiments. On the contrary, the present teachings encompass various alternatives and equivalents, as will be appreciated by those of skill in the art.

An exemplary embodiment of the present invention relates to an opto-electronic package having two enclosures in which a first non-hermetic enclosure provides the structural rigidity required to maintain the alignment of the optical components for a predetermined environmental range and a second flexible enclosure that provides a hermetical seal for the opto-electronic package, thereby maintaining the index of refraction of the medium inside the package by maintaining the volume of the package under varying external pressure. In this way the alignment of the optical beam is maintained as it propagates through the optical system.

Eliminating the structural package's need to be compatible with the electrical and optical feedthroughs, which drives specific CTE choices and exotic plating and tight machining tolerances as described above, opens the door to a wide variety of lower cost materials for the non-hermetic structural package. Among the options are cast aluminum or molded plastic, both of which are cheaper as raw materials than typical CTE matching materials, e.g Kovar, and also avoid the added cost of extra machining.

Figure 1:
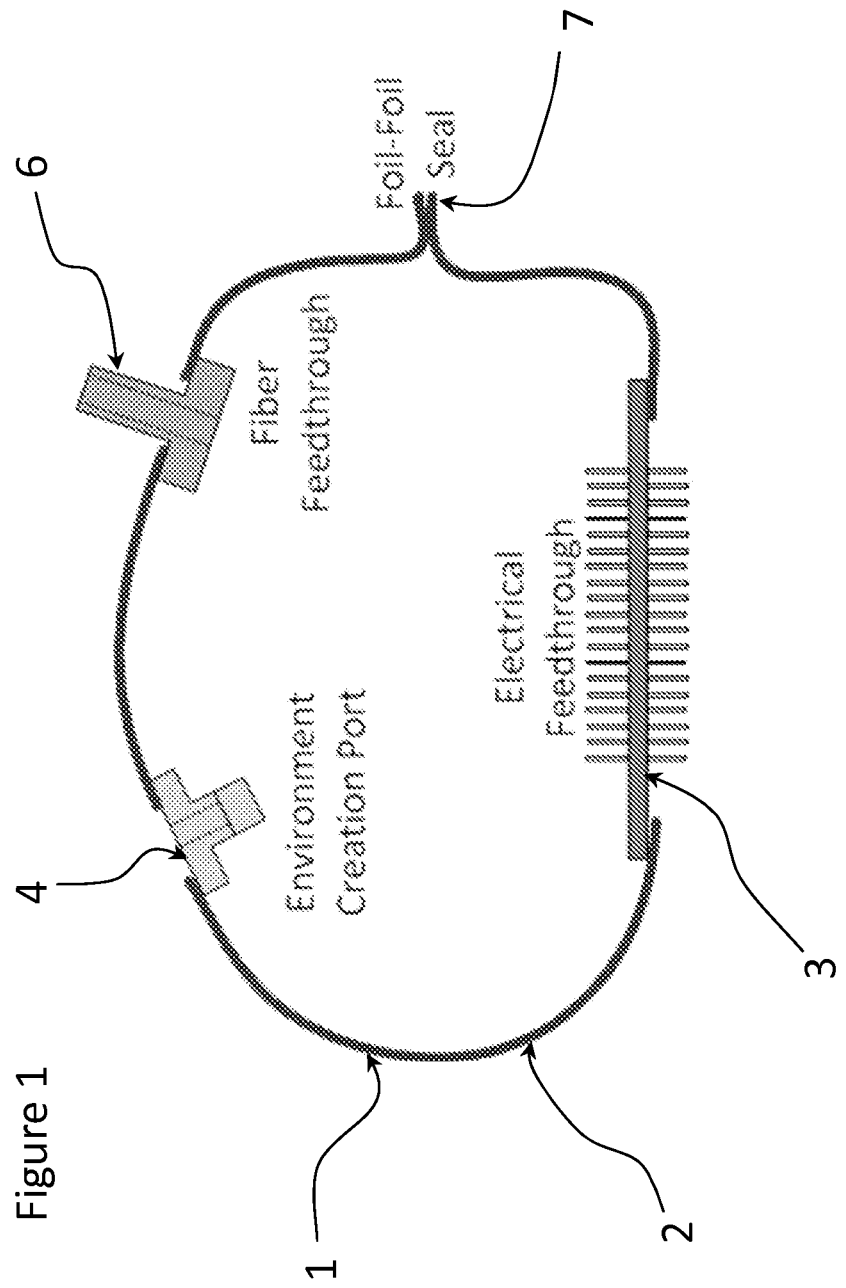
FIG. 1 illustrates a cross-sectional view of a flexible barrier package in accordance with an exemplary embodiment of the present invention.

With reference to FIG. 1, a flexible hermetic barrier package 1, of an exemplary embodiment of the present invention, may comprise a flexible membrane 2, such as a metallic membrane foil e.g. Aluminum, e.g. with a suitable thickness, e.g. greater than 25 um, to reduce the likelihood of pinhole defects and also offer an attractive cost. Other metals are within the scope of the invention, even a suitable non-metallic flexible film is within the scope of the invention.

Apart from sealing process considerations there is no maximum for the thickness of the flexible membrane 2 from an application perspective. As described below, a rigid aluminum housing has been used to form the "balance" of the package 1 apart from the feedthroughs in other products.

Moreover, the 25 um thickness is not a hard and fast minimum, i.e. the minimum thickness to avoid pinholes in the flexible hermetic foil or film membrane 2 that would compromise the hermeticity. It could be that advances in the field of foil and film production someday allow a thinner foil to be delivered that is free of pinholes.

A possible enhancement, at modest cost, is to include a polymer coating or other secondary coating that would add strength to the flexible membrane 2 to enhance robustness to handling and abrasion/perforation resistance. A flexible membrane that is a laminate between a layer providing hermeticity and a layer providing abrasion/perforation resistance may also be used.

Various hermetic feedthroughs though the flexible barrier package 1, may include any one or more of an electrical feedthrough 3, an environment creation port 4, and an optical fiber feedthrough 6, each with an access port extending therethrough. The individual hermetic feedthroughs 3, 4 and 6 could be coupled to the flexible membrane 2 by a number of hermetic joining methods, such as ultrasonic welding, laser welding, resistance welding etc. If necessary, mechanical reinforcement of the seals for the hermetic feedthrough 3, 4 and 6 could be achieved through the subsequent application of a flexible strain relief, such as silicone. A bulk hermetic seam 7 is provided to seal the flexible barrier package 1 to achieve full hermeticity.

Figure 2:
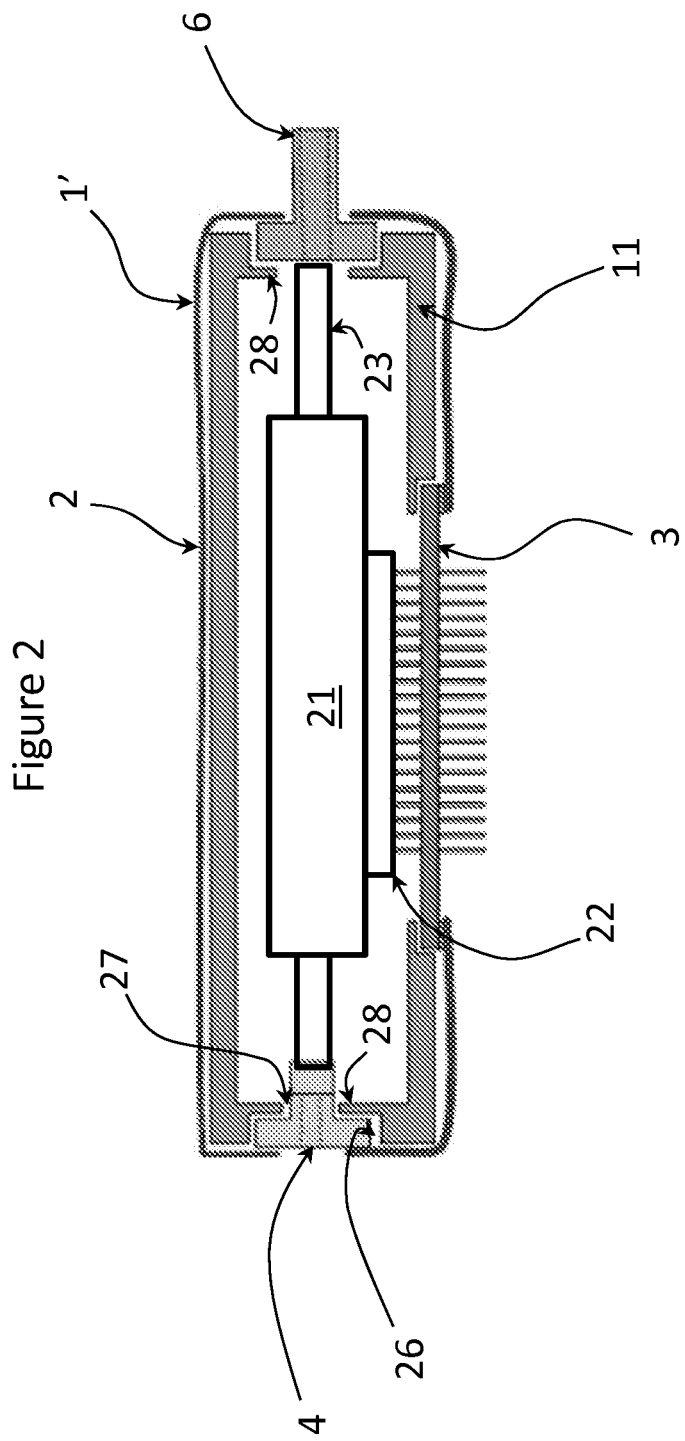
FIG. 2 illustrates a cross-sectional view of an optical package in accordance with an exemplary embodiment of the present invention.
Figure 4:
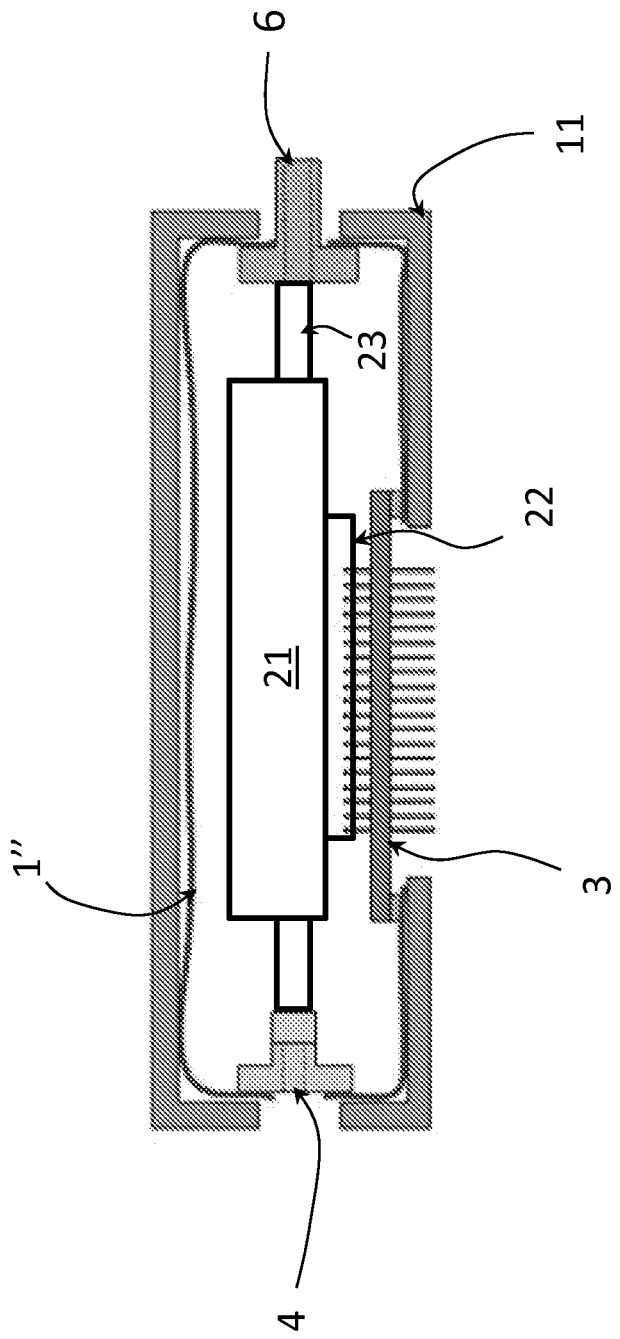
FIG. 4 illustrates a cross-sectional view of an alternative embodiment of the present invention.

With reference to FIGS. 2 and 4, integration of the flexible barrier package 1 with a stiff structural package 11 provides the necessary mechanical support for the optical components. The barrier package 1' with one or more feedthroughs, e.g. various feedthroughs 3, 4 and 6, is hermetically sealed to achieve a fully hermetic interior environment, as in FIG. 1, and integrated with the structural package 11 either by being vacuum sealed as a cover 1' on the outside of the structural package 11, as in FIG. 2 or by being installed as an inflated bladder 1" within the structural package 11, as in FIG. 4.

To meet the volume stability requirement it is important that the flexible barrier package 1 and the structural package 11 be substantially conformal. If there is a gap between the flexible barrier package 1 and the non-hermetic external structural package 11, it will allow the flexible barrier package 1 to expand and contract under the influence of external pressure fluctuations, and violate the requirement for volume stability.

As illustrated in FIG. 2, the structural package 11 is initially provided with an optical component 21 having electrical and optical elements 22 and 23 aligned with the electrical and optical feedthroughs 3 and 6, respectively. The flexible barrier package 1' is formed around the structural package 11 with the feedthroughs 3, 4 and 6 extending through corresponding openings in the structural package 11. Preferably, the openings in the structural package 11 include a wider external recess 26 in the structural package 11 and a smaller internal recess 27 with a shoulder 28 therebetween for abutting against the corresponding feedthrough 3, 4 and 6. The flexible barrier package 1 is then sealed along the seal 7.

Figures 3A, 3B:
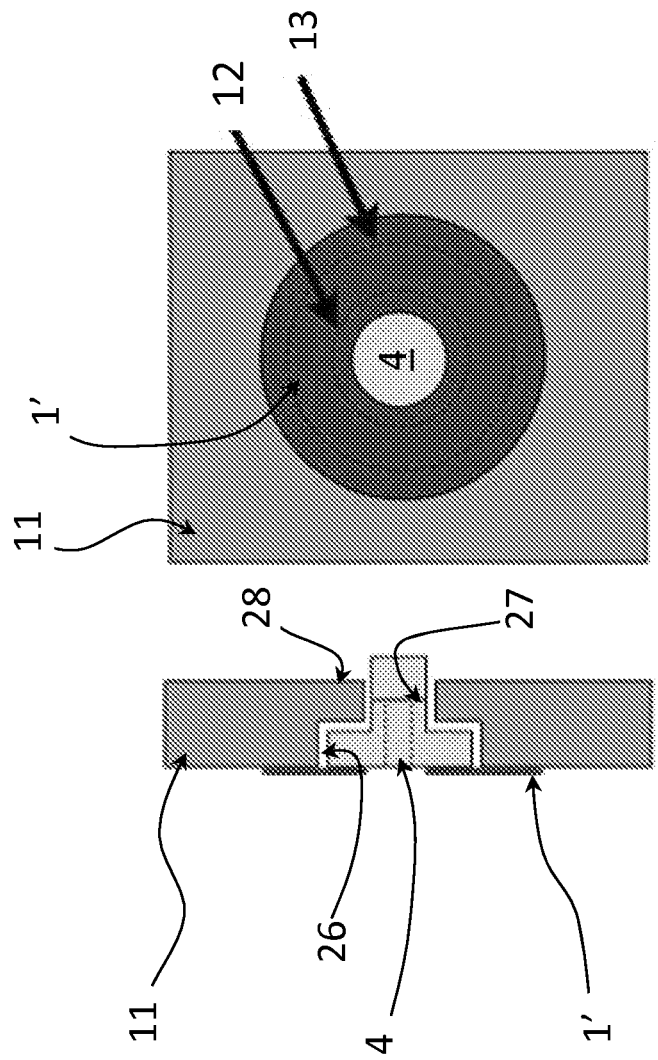

In the embodiment of FIG. 2, the interior volume would have to be under-pressurized relative to the exterior, e.g. by at least 10% of atmospheric pressure, preferably up to half an atmosphere, preferably between an 15% and a 50% of an atmosphere, and more preferably between a quarter and a half an atmosphere, to ensure that when the external pressure changes due to altitude of operation as well as ambient pressure fluctuations, the flexible package 1' remains conformed, i.e. "sucked against", the structural package 11, so that the internal volume of the flexible package 1' does not change. Ideally, a vacuum source may be connected to the environment creation port 4 for setting the internal pressure to the desired level. As a result of the under-pressurized internal atmosphere, the feedthroughs 3, 4 and 6 are held in the external recesses 26 abutting against the shoulders 28. In other words the internal pressure of the package may be less than 90 kPa, preferably at least about 50 kPa, more preferably between 50 kPa and 85 kPa, and more preferably between 50 kPa and 75 kPa, With reference to FIGS. 3a and 3b, the flexible barrier package 1' with the various feedthroughs 3, 4 and 6 may be hermetically sealed to the structural package 11 via first and second independently hermetically-sealed barriers 12 and 13, which are used to seal two separate portions of the flexible barrier package 1, i.e. the feedthrough 3, 4 or 7 to the flexible membrane 2, and the flexible membrane 2 to the structural package 11, respectively. Ideally the first and second barriers 12 and 13 are annular and concentric, with the second barrier 13 surrounding the first barrier 12; however other suitable shapes are within the scope of the invention. In this embodiment, the flexible barrier package 1' need not be a single sealed enclosure surrounding the optical element, but rather a plurality of individual sheets, each sheet surrounding one or more of the openings in the structural package 11. (See FIG. 5 for further details) Each individual sheet will include at least the first seal 12 with the corresponding feedthrough, e.g. 3, 4 and/or 6, around the access port therein, and the second seal 13 with the structural package 11 around the openings therein.

In other embodiments the structural package 11 is not sealed to the flexible barrier package 1.

As illustrated in FIG. 4, the flexible barrier package 1" may alternatively be contained within the structural package 11. Accordingly, the optical component 21 is mounted within the flexible barrier package 1" with the electrical and optical elements 22 and 23 aligned with the electrical and optical feedthroughs 3 and 6. The flexible barrier package 1" is then hermetically sealed along seal 7. The flexible barrier package 1" with the optical component 21 are then mounted within the structural package 11 with the feedthroughs 3, 4 and 6 aligned with the openings therein. In this embodiment, the interior volume of the flexible barrier package 1" is over-pressurized relative to the exterior, e.g. by at least 10% of atmospheric pressure, preferably by as much as half an atmosphere, more preferably between 15% and 50% more than atmospheric pressure, and most preferably between a quarter and a half atmosphere more, to ensure that when the external pressure changes due to altitude of operation as well as ambient pressure fluctuations, the flexible package 1" remains "pressed against" the structural package 11 so that the internal volume doesn't change. Ideally, a source of pressure may be connected to the environment creation port 4 for setting the internal pressure to the desired level. In other words the internal pressure of the package may be greater than 110 kPa, preferably at least about 150 kPa, more preferably between 115 kPa and 150 kPa, and more preferably between 125 kPa and 150 kPa, In either of the aforementioned embodiments a suitable adhesive may be provided at suitable specific locations or over almost the entire surface of the flexible membrane 2, e.g. greater than 50% of the area of the flexible membrane 2, between the structural package 11 and the flexible package 1, which would ensure that the two packages 1 and 11 are conformal.

In another exemplary embodiment, utilizing the same basic structures as FIGS. 2 and 4, but without any unbalanced pressurization, the device may be provided with an internal pressure approximately equal to the external pressure to avoid significant over or under-pressurization, which can accelerate gas exchange through even small but finite leaks under certain conditions. In this embodiment, an adhesive may be provided to ensure the conformity of the flexible package 1 to the structural package 11. Ideally, the adhesive may be provided at specific location, e.g. corners and openings, or over almost the entire surface of the flexible material 2, e.g. greater than 50%, preferably greater than 75%, and ideally greater than 90% of the area of the flexible membrane 2.

Use of an adhesive is probably more applicable to the flexible package 1" within the structural package 11, FIG. 4, since the adhesive would not be contained within the hermetic volume of the flexible package 1', and hence any outgassing products originating from the adhesive would also not be contained in the hermetic volume.

Similar to FIG. 4, the flexible barrier package 1" could reside inside a structural package 11, but in an alternative exemplary embodiment, the structural package 11 could be "applied" to the flexible barrier package 1 to the flexible membrane 2 around and overlapping the edges of the feedthroughs 3, 4 and 6, as some kind of paint or other fluid that subsequently hardens to provide the structural rigidity. This embodiment would have the advantage of not requiring an over-pressure to make the flexible membrane 2 conform to the volume defined by the structural package 11.

In a slightly different embodiment, the sealed flexible barrier package 1 (See FIG. 1) is provided with the optical component 21 mounted therein with the electrical and optical elements aligned with the electrical and optical feedthroughs 3 and 6, respectively, and then subsequently "dipped" into a resin or other substance that subsequently hardens to form a conformal structural package 11. The sealed flexible package 1 is held at a suitable location, e.g. one of the feedthroughs 3, 4 or 6, during the dipping process. Sacrificial covers may be provided for protecting the feedthroughs 3, 4 and 6 during the dipping step, which are then removed after dipping before, during or after the hardening step.

Figure 5:
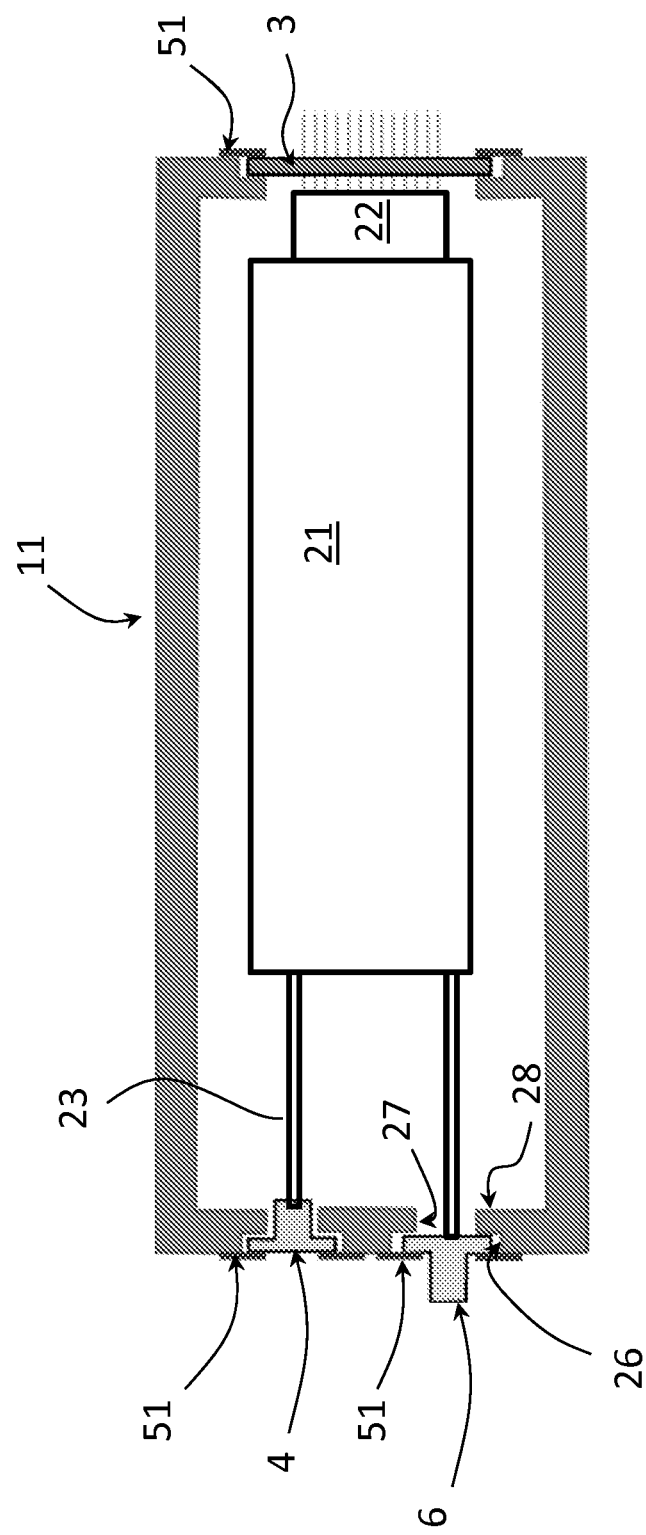
FIG. 5 illustrates a cross-sectional view of an alternative embodiment of the present invention.

In an alternative embodiment, illustrated in FIG. 5, the structural package 11 is provided with an optical component 21 mounted therein, and includes at least one of an electrical and optical element 22 and 23 aligned with corresponding electrical and/or optical feedthroughs 3, 4 and 6, respectively. The flexible barrier package may be comprised of one or a plurality of individual flexible barrier sheets 51 with a hole therethrough aligned with the openings in the structural package 11. The individual flexible barrier sheets are used to form seals between the structural package 11 and the feedthroughs, e.g. 3, 4 and 6, which extend through corresponding openings in the structural package 11. Preferably, the openings in the structural package 11 include a wider external recess 26 in the structural package 11 and a smaller internal recess 27 with a shoulder 28 therebetween for abutting against the corresponding feedthrough 3, 4 and 6.

With reference to FIGS. 6a and 6b, the flexible barrier package sheets 51 may be hermetically sealed to the structural package 11 via first and second independently hermetic seals 12 and 13, which are used to seal two separate portions of the flexible barrier package sheet 51, i.e. around the access ports in the feedthrough 3, 4 or 6 to the flexible membrane sheet 51, and the flexible membrane sheet 51 to around the openings in the structural package 11, respectively. Ideally, the flexible barrier package sheets 51 are annular and concentric with the openings in the structural package 11. Ideally, the first and second barriers 12 and 13 are annular and concentric with each other, with the second barrier 13 surrounding the first barrier 12; however other suitable shapes and arrangements are within the scope of the invention.

The interior atmospheric pressure of the structural package 11 of this embodiment may or may not be different than that of the exterior, as herein before discussed.

The foregoing description of one or more embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. A device comprising:
  a package housing an optical component;
  a first feedthrough extending through a first opening in the package;
  a second feedthrough extending through a second opening in the package, wherein
    the first feedthrough, when positioned in the first opening, results in a third opening surrounding the first feedthrough, and
    the second feedthrough, when positioned in the second opening, results in a fourth opening surrounding the second feedthrough;
  a first barrier sheet, aligned with the first opening, covering the third opening and forming a first seal between the package and the first feedthrough; and
  a second barrier sheet, aligned with the second opening, covering the fourth opening and forming a second seal between the package and the second feedthrough.

2. The package of claim 1, wherein the first barrier sheet and the second barrier sheet are flexible.

3. The package of claim 1, wherein the first seal is a hermetic seal and the second seal is a hermetic seal.

4. The package of claim 1, wherein
  the first barrier sheet forms the first seal using a first hermetic seal and a second hermetic seal, and
  the second barrier sheet forms the second seal using a third hermetic seal and a fourth hermetic seal.

5. The package of claim 4, wherein
  the first hermetic seal and the second hermetic seal are annular and concentric with respect to the third opening, and
  the third hermetic seal and the fourth hermetic seal are annular and concentric with respect to the fourth opening.

6. The package of claim 4, wherein
  the first hermetic seal and the second hermetic seal are annular and concentric with respect to each other, and
  the third hermetic seal and the fourth hermetic seal are annular and concentric with respect to each other.

7. The package of claim 4, wherein
  the first hermetic seal seals the first barrier sheet to the first feedthrough,
  the second hermetic seal seals the first barrier sheet to the package,
  the third hermetic seal seals the second barrier sheet to the second feedthrough, and
  the fourth hermetic seal seals the second barrier sheet to the package.

8. The package of claim 1, wherein an interior atmospheric pressure of the package is substantially the same as an exterior atmospheric pressure.

9. A device comprising:
  a package housing an optical component;
  a feedthrough extending through a first opening in the package,
    wherein the feedthrough, when positioned in the first opening, results in a second opening surrounding the feedthrough; and
  a barrier sheet, aligned with the first opening, covering the second opening and forming a seal between the package and the feedthrough.

10. The package of claim 9, wherein the barrier sheet is flexible.

11. The package of claim 9, wherein the seal is a hermetic seal.

12. The package of claim 9, wherein the barrier sheet forms the seal using a first hermetic seal and a second hermetic seal.

13. The package of claim 12, wherein the first hermetic seal and the second hermetic seal are annular and concentric with respect to the second opening.

14. The package of claim 12, wherein the first hermetic seal and the second hermetic seal are annular and concentric with respect to each other.

15. The package of claim 12, wherein
  the first hermetic seal seals the barrier sheet to the feedthrough, and
  the second hermetic seal seals the barrier sheet to the package.

16. The package of claim 9, wherein an interior atmospheric pressure of the package is substantially the same as an exterior atmospheric pressure.

17. A method comprising:
  mounting an optical component within a package, wherein
    the package includes a first opening to receive a feedthrough, and
    the feedthrough, when positioned in the first opening, results in a second opening surrounding the feedthrough; and
  covering the second opening with a barrier sheet that is aligned with the first opening,
    wherein the barrier sheet forms a seal between the package and the feedthrough.

18. The method of claim 17, wherein the barrier sheet forms the seal using a first hermetic seal and a second hermetic seal.

19. The method of claim 18, wherein the first hermetic seal and the second hermetic seal are annular and concentric with respect to at least one of:
   the second opening, or
   each other.

20. The method of claim 18, wherein
   the first hermetic seal seals the barrier sheet to the feedthrough, and
   the second hermetic seal seals the barrier sheet to the package.

\* \* \* \* \*